No. 744,436. PATENTED NOV. 17, 1903.
I. TENNANT.
PNEUMATIC TIRE.
APPLICATION FILED AUG. 19, 1903.
NO MODEL.

Witnesses
G Howard Walmsley
Edwin Walmsley

Inventor
Ervin Tennant,
By
Attorney

No. 744,436. Patented November 17, 1903.

UNITED STATES PATENT OFFICE.

IRVIN TENNANT, OF SPRINGFIELD, OHIO, ASSIGNOR TO TENNANT AUTO-TIRE COMPANY, OF SPRINGFIELD, OHIO, A CORPORATION OF NEW JERSEY.

PNEUMATIC TIRE.

SPECIFICATION forming part of Letters Patent No. 744,436, dated November 17, 1903.

Original application filed June 25, 1903, Serial No. 163,000. Divided and this application filed August 19, 1903. Serial No. 170,019. (No model.)

*To all whom it may concern:*

Be it known that I, IRVIN TENNANT, a citizen of the United States, residing at Springfield, in the county of Clark and State of Ohio, have invented certain new and useful Improvements in Pneumatic Tires, of which the following is a specification, reference being had therein to the accompanying drawings.

This invention relates to pneumatic tires, and has for its object to provide a construction whereby the tire may be protected from puncture without undue sacrifice of resilience and wearing qualities of the tire.

To these ends the invention consists in certain novel features, which I will now proceed to describe and will then particularly point out in the claims.

Figure 1:
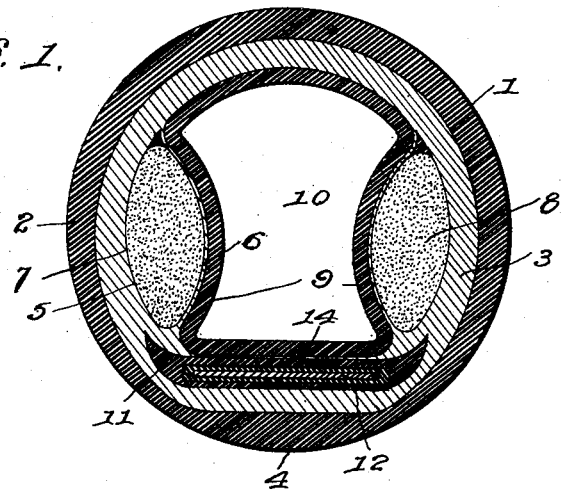
Figure 2:
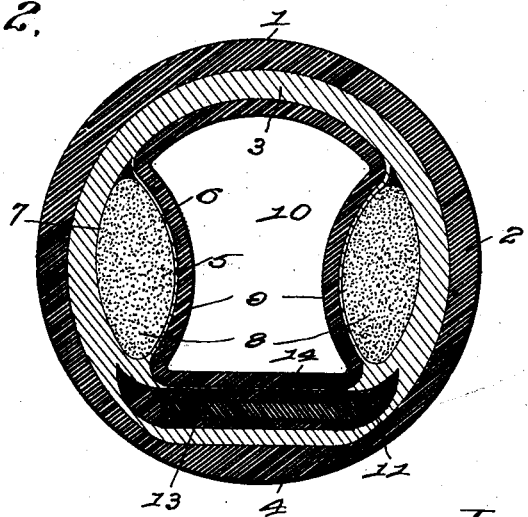

In the accompanying drawings, Figure 1 is a sectional view of a tire embodying my invention in one form, and Fig. 2 is a similar view illustrating another form of my invention.

The present invention is in the form of an improvement upon the construction set forth in my prior Letters Patent, No. 709,280, granted to me September 16, 1902.

In the accompanying drawings the tire is shown as composed of a tubular body 1, built up of an outer portion 2, of rubber, and an inner portion 3, of fabric, the tire being preferably thickest at the tread portion 4. Within the tire at the sides thereof are located tubular spaces 5, defined by walls of fabric 6 and 7 and having a protective filling 8, preferably of sponge-rubber. These protective bodies are elongated in cross-section, with their longitudinal axes converging outwardly, as shown, their outer ends being closer together than their inner ends.

9 indicates the inner tube or air-tube proper, which lines the air-space 10 and makes the same air-tight.

In connection with the tire thus constructed I employ a protective strip embedded in its tread and made of a similar or analogous material, but of greater hardness, united to the body of the tire in the process of curing. I prefer to employ as the material from which this hard protective strip is made balata-gum, suitably compounded with sulfur and other ingredients, so as to give it the desired hardness, in any of the approved ways well known to those skilled in the art. As known equivalents of this material, although I do not deem them equally desirable, I include within the term "similar or analogous material" as employed herein hard rubber, being india-rubber so compounded as to become what is technically known as "hard" rubber or "vulcanite" and "gutta-percha." All these materials have the quality of hardening to the desired degree of hardness during the process of curing the tire as a whole and also the quality of not cutting out or injuring the body of the tire when in use. Where a metallic protective strip is employed, its edges are apt to cut the body of the tire, owing to the difference in character of the two materials, unless special provisions are made to prevent such cutting, and these provisions are not always effective. The protective strip which I have devised being of a similar or analogous material has sufficient flexibility and a sufficient surface area at its edges to overcome this cutting tendency, thereby increasing both the durability and resilience of the tire over a similar tire employing a metallic protective strip, while the protection against puncture obtained by the use of the protective strip of similar or analogous material is sufficient for its purpose. I may, however, embed within the protective strip a metallic core in the form of a flat strip entirely inclosed by the protective strip, in which case the protection against puncture is rendered more complete, while the resilience of the tire is diminished in a slight degree only, owing to the possibility of thus employing a metallic strip of extreme thinness. So thin a metallic strip could not be successfully employed in the absence of the surrounding envelop of material similar to but harder than the body of the tire, for the reason that it would rapidly cut out in use.

The protective strip of material similar or analogous to the rubber of the tire is indicated at 11 and is embedded in the tread portion on the tire, having a greater width than the exposed portion of the central air-chamber. This protective strip may be made of a compound such that it will harden to the desired degree during the process of curing or vulcanizing the body of the tire, and in this case the material of which the said strip is composed is placed in position before curing in a "green" or uncured condition, its curing being accomplished in a single and continuous operation along with the curing of the rest of the tire; but in practice I prefer to employ a compound such that the curing of the tire will not sufficiently cure the protective strip, and I therefore first partially cure the protective strip, placing it in the uncured tire in a partially-cured condition, so that the curing of the tire will complete the curing of the strip.

In Fig. 1 I have shown at 12 a metallic core for the protective strip consisting of a thin strip or ribbon of steel or other suitable metal. This core is inclosed in the strip before the strip is placed in position in the tire.

In Fig. 2 I have shown a construction similar in all respects to that shown in Fig. 1 and just described, except that the protective strip of material analogous to the rubber of which the tire is composed, which strip is indicated by the reference-numeral 13, has no metallic core.

In both of the figures of the drawings I have shown a strip of fabric impregnated with rubber (indicated at 14) interposed between the protective strip and the body of rubber in which it is embedded, the same being a preferred form of construction which materially aids in effecting a firm union between the said protective strip and the surrounding rubber.

I do not wish to be understood as limiting myself strictly to the precise details of construction hereinbefore described, and shown in the accompanying drawings, as these details may obviously be modified without departing from the principle of my invention.

I make no claim, broadly, in the present application to the protective strip of similar or analogous material to the body of the tire, as the same forms the subject-matter of another application, filed June 25, 1903, Serial No. 163,000, of which the present application is a division.

Having thus fully described my invention, what I claim as new, and desire to secure by Letters Patent, is—

1. A pneumatic tire, comprising a tubular body of rubber having a thickened tread, lateral inwardly-arched diaphragms forming lateral protective chambers, one on each side of the tire and coextensive with the exposed portions of said side, and a central chamber for compressed air, protective fillings of compressible material located in the lateral protective chambers, and a protective strip of similar or analogous material to the body of the tire, located in the tread thereof, and having a width at least equal to the width of the exposed portion of the central air-chamber, substantially as described.

2. A pneumatic tire, comprising a tubular body of rubber having a thickened tread, lateral inwardly-arched diaphragms forming lateral protective chambers, one on each side of the tire and coextensive with the exposed portions of said side, and a central chamber for compressed air, protective fillings of compressible material located in the lateral protective chambers, and a protective strip of similar or analogous material to the body of the tire, located in the tread thereof, and having a width at least equal to the width of the exposed portion of the central chamber, said protective strip having a flat ribbon-like metallic core inclosed therein, substantially as described.

In testimony whereof I affix my signature in presence of two witnesses.

IRVIN TENNANT.

Witnesses:
IRVINE MILLER,
AL. H. KUNKER.